Feb. 17, 1970     D. B. PALL     3,495,566
PRESSURE-RESPONSIVE DEVICES HAVING CONTROLLED
RESPONSE TO FLOW SURGES
Filed March 13, 1967     2 Sheets-Sheet 1

United States Patent Office 3,495,566
Patented Feb. 17, 1970

3,495,566
PRESSURE-RESPONSIVE DEVICES HAVING CONTROLLED RESPONSE TO FLOW SURGES
David B. Pall, Roslyn Estates, N.Y., assignor to Pall Corporation, Glen Cove, N.Y., a corporation of New York
Filed Mar. 13, 1967, Ser. No. 622,586
Int. Cl. G01l *19/12*
U.S. Cl. 116—70        10 Claims

ABSTRACT OF THE DISCLOSURE

A fluid differential pressure-responsive device, such as a differential pressure indicator, is provided which incorporates a flow restrictor in the line of flow to the indicating mechanism. This flow restrictor is movable in response to a flow surge to constrict the line and limit flow to the indicating mechanism to inhibit response of the indicator to a flow surge.

A flow restricting device for incorporation into a line leading to pressure-responsive device, such as a differential pressure indicator, is also provided. The flow restricting device comprise a flow restrictor, such as a poppet, which is operatively connected to a diaphragm, and is associated with a small flow control passage. The poppet is mounted for movement in response to a pressure differential across the diaphragm caused by a flow surge to the flow control passage to constrict the line to the indicator thereby limiting flow therethrough.

---

This invention relates to fluid differential pressure-responsive devices having a controlling response to flow surges and, more particularly, it relates to fluid differential pressure-responsive devices incorporating a flow-restricting means that, in response to a flow surge, constricts a passage leading to the pressure-responsive device to restrict flow therethrough, thereby inhibiting response of the device to flow surges.

In systems having pressure-responsive devices, such as fluid pressure differential indicators and fluid pressure differential switches, it is not uncommon that flow surges of relatively short duration occur. Often, such flow surges occur at times in the operation of the system at which response of the indicator or switch or the like is not desired.

One example of the above is of particular note. In the hydraulic systems of aircraft, filter assemblies are normally provided. It is quite important in such systems to know when the filter element has become clogged by contaminants so that it may be replaced before damage to components of the systems result. Pressure indicating devices therefore tap fluid pressure on both sides of the filter element, so that when the filter becomes clogged with contaminants, and the pressure differential across the filter increases to, and exceeds a predetermined minimum, actuation of the pressure differential indicator results, thus signaling that the filter element should be replaced.

During normal flight of aircraft, a flow of hydraulic fluid of the order of 5 gallons per minute or less is all that is required to operate the hydraulic equipment. However, at landing or takeoff, a higher flow rate of the order of 30 gallons per minute is required, to operate the landing gear. At this time, a sudden flow surges through the hydraulic lines and the filter assemblies that are part of the system. Although these high flow rates can pass through the filter assemblies, they often cause actuation of the pressure indicator. This is due to the fact that a flow surge in the line to the filter assembly normally causes a temporary high fluid pressure differential thereacross, extending the minimum, causing actuation of the indicator. Since pressure indicators are not capable of differentiating between excessive pressure differentials due to flow surges, and those caused by clogging the filter, such signaling of the indicator during a flow surge is misleading.

Devices have been provided by the prior art in an attempt to overcome this problem. One such device is shown in U.S. Patent No. 3,212,471 to Willis. Another such device is shown in U.S. Patent No. 3,270,884 to Bremer. Other devices are shown in U.S. Patent No. 1,087,883 to Loomis, and U.S. Patent No. 2,897,675 to Kocher et al. These patents all disclose means for damping or delaying the response of a pressure gauge or pressure indicator to the predetermined pressure differential. This is accomplished in the same general manner in all of these devices by providing an orifice or a small passage of fixed size in the line to limit the flow to the device. Such orifices and passages have the disadvantage that, in order to cause a sufficient delay in response of the indicator, they must be quite small. Thus, the delay caused by these small passages at normal indicating pressure differentials can be excessive, and delay even the desired response when a filter element is clogged. Moreover, since the orifices and passages are quite small, they can be clogged rather easily, anad are undesirably viscosity-sensitive.

Furthermore, the size of the passages and orifices shown in the above patents is fixed, and must be adapted to delay the average flow surge expected to be encountered. This means that the indicator can still respond to an extraordinarily high flow surge, and that its response to a clogged filter can also be slowed. In a filter system, since the pressure developed by a flow surge can vary somewhat, depending upon the state of clogging of the filter element, a further complication is introduced.

The instant invention provides a pressure-responsive device whose rate of actuation can be delayed to substantially the same extent for any flow surge. This pressure-responsive device comprises, in combination, a housing; a first fluid line in the housing communicating with a first source of fluid pressure; a second fluid line in the housing communicating with a second source of fluid pressure; indicating or operating means mounted in the housing between the two fluid lines, and in communication therewith, for movement to and from an operating position in response to changes in pressure between the two fluid lines; and a flow-restricting means in the first fluid line for inhibiting response of the indicator to surges in flow in the line, said means being mounted for movement to constrict said line in response to a flow surge in said fluid line, to control the rate of flow therethrough and thereby inhibit response of the device to a flow surge.

This invention also provides an improved flow-restricting means for controlling response of a pressure-responsive device to flow surges comprising, in combination, a flow control passage leading to the pressure-responsive device and dimensioned to restrict flow therethrough and cause a pressure differential thereacross when a flow surge occurs; a poppet movable toward and away from a position obstructing the path of flow to the pressure-responsive device and a diaphragm disposed in relation to the flow control passage so as to be subjected to the fluid pressure differential caused by a flow surge to the flow control passage, and movable in response thereto, and said diaphragm being operatively connected to the poppet for movement thereof with the diaphragm in response to a flow surge to restrict flow to the pressure responsive device.

The pressure-responsive device of the instant invention in which the means to control response to flow surges is incorporated can be a pressure-responsive switch, a pressure indicator, a pressure gauge, or the like. Such devices normally are provided with two fluid lines, each communicating with a source of fluid pressure. These devices are also normally provided with means such as a diaphragm, or piston, or the like, which move in response to changes in fluid pressure between the two lines to cause actuation of a switch, signaling by an indicator, or movement of a needle of a gauge. The manner in which signaling and the like is caused can be mechanical, magnetic, electrical, or the like.

Typical devices that are of the type indicated above, that are examples of the pressure-responsive devices contemplated by the instant invention, are shown in U.S. Patent Nos. 2,942,572 to Pall; 3,077,176 to Pall et al.; 3,077,854 to Pall; 3,124,959 to Pall et al.; 3,140,690 to Seibel; 3,187,711 to Campolong; 3,209,721 to Pall et al.; 2,843,077 to Leefer; 2,803,718 to Bloom et al.; 2,948,151 to Astl; 2,824,186 to Binford, and 3,011,470 to Stoermer.

Figure 1:
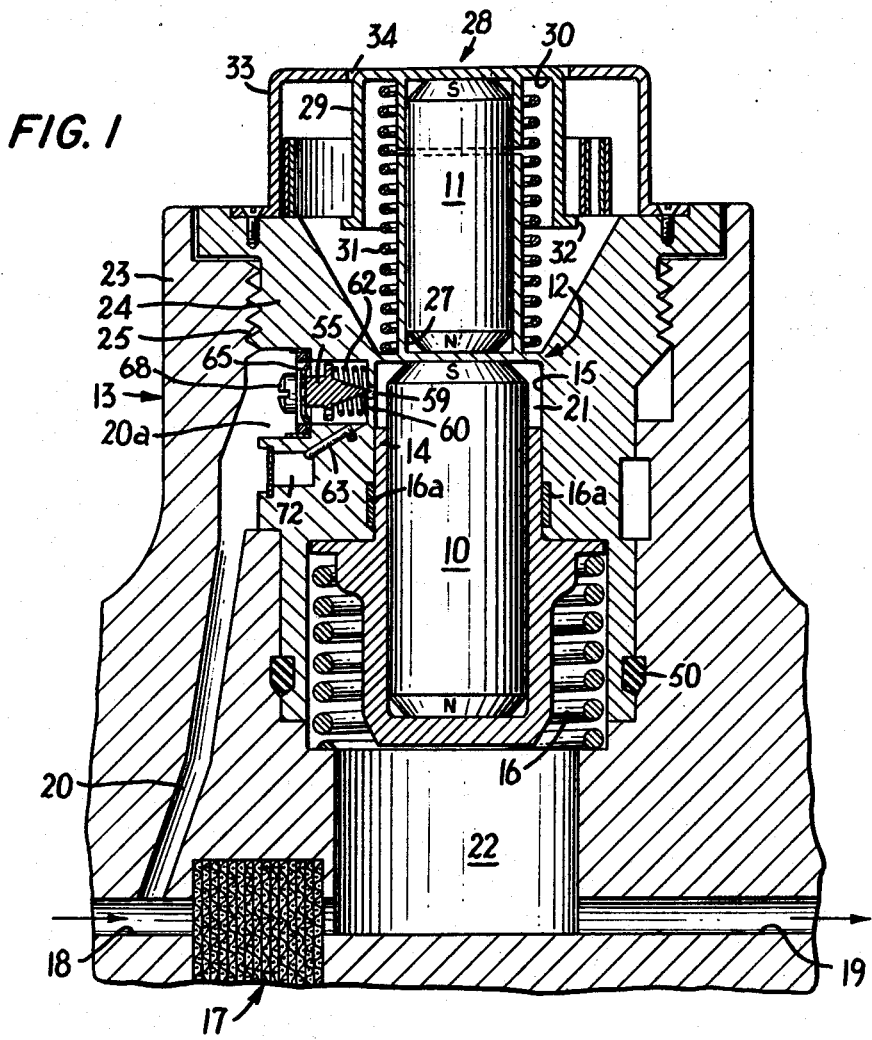
FIGURE 1 is a view in cross-section of a pressure indicator having a controlled response to flow surges.

The controlled response to flow surges of the instant invention is provided by a flow-restricting device in the fluid line that leads from a first source of fluid pressure to the indicating or operating mechanism of the pressure-responsive device. This line will be referred to hereinafter as the first fluid line.

The flow-restricting device of this invention includes a flow restrictor, preferably in the form of a poppet, that is biased, preferably by a spring, in a generally non-flow-restricting position. The flow-restrictor could also be a piston, a diaphragm, or needle valve.

The flow-restricting device is mounted in the housing in position to constrict, restrict, or obstruct the first fluid line upon movement of the flow-restrictor in response to a flow surge. The flow-restricting device can be mounted in a bore or in a chamber in the housing. It is also possible to mount the flow restricting device in the line itself. The chamber or bore should be located such that the flow restricting device is exposed to fluid pressure in the first fluid line and can move to constrict or restrict a portion of the first fluid line.

This can be accomplished by mounting the flow restrictor in a bore in the housing that is adjacent to the first fluid line. The bore should communicate at one end with a portion of the first fluid line to expose the flow restrictor to fluid pressure at that point. This end preferably opens into an enlarged portion of the line or chamber adjacent to the bore. The other end of the bore should communicate with a portion of the first fluid line that is downstream of the point at which the other end of the bore communicates with and it should permit movement of the flow restrictor into the line to obstruct flow in the line when the flow restrictor moves in response to a flow surge. An orifice can be provided in the line and the flow restrictor can obstruct or restrict flow through the orifice. However, the flow restrictor can restrict the line itself and no orifice or the like need be provided.

A flow control passage can be provided as a part of the flow-restricting device to conduct flow from the chamber or enlarged portion of the first fluid line to the operating or indicating mechanism of the pressure-responsive device. This flow control passage can comprise a portion of the first fluid line. It can comprise the entire portion of the first fluid line leading from the chamber or enlarged portion to the indicating or operating mechanism, or just a part thereof. If no chamber or enlarged portion is provided, the flow control passage can be a restricted or narrow portion of the first fluid line.

The flow control passage should have a relatively small diameter and should be dimensioned to restrict flow therethrough. It should also be of a sufficient length to, in combination with its small diameter, limit the amount of flow that can pass through it in a given time, to delay the communication of a flow surge therethrough. The flow control passage could be a narrow bore in the housing or a capillary size tube or the like. The dimensions of the flow control passage can be determined by the pressure conditions normally found in the system, and the normal viscosity of the fluid. However, diameters of 0.003 inch to about 0.012 inch, and lengths of about 1 inch to about 24 inches have been found to be appropriate for the hydraulic fluids and operating conditions normally occurring in aircraft.

The flow restrictor can either obstruct flow in the flow control passage or through a remaining part of the first line downstream of the flow control passages and the flow control passage should be located in the first fluid line downstream of the point at which the flow restrictor communicates with the line. Thus, when a high pressure differential is created by a flow surge to the flow control passage the high pressure can act on the flow restrictor to cause movement thereof to constrict the line to the operating mechanism of the device. The relationship between the flow control passage and the flow restrictor will be more particularly described below.

The sensitivity of the response of the flow-restricting device can be increased by providing a diaphragm located adjacent to the flow restrictor for movement thereof. The diaphragm should have a relatively large surface area relative to the flow restrictor. Thus, the pressure acting on the diaphragm exerts a greater force on the restrictor, since it acts over a larger area. Consequently, more rapid response of the flow-restricting device is provided.

The diaphragm can be formed in any desired shape, convenient to the space available in the housing. It could be round, rectangular, square, etc. A diaphragm, however, need not be used at all. The flow-restrictor can itself have a flat end of relatively large surface area against which the force of the flow surge acts.

Figure 4:
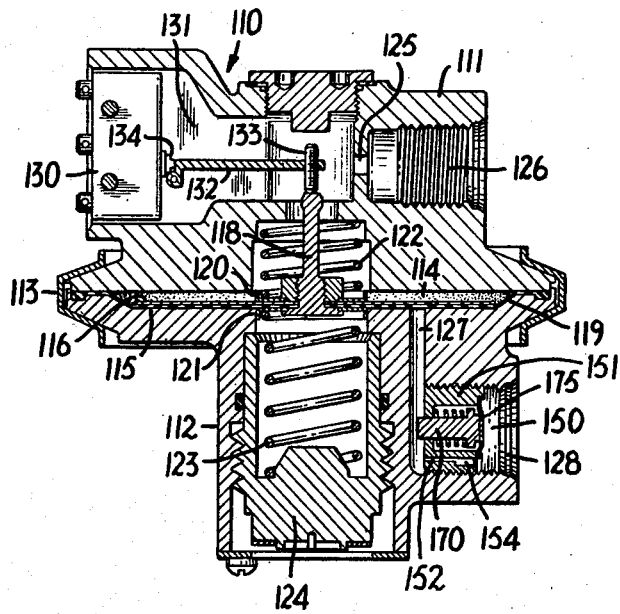
FIGURE 4 is a view in cross-section of a pressure-responsive switch having another embodiment of the flow restricting device to control response to flow surges.

When a surge of flow occurs in a fluid system, the fluid pressure increases in the line to the pressure indicator or switch, and fluid is forced to flow to the operating mechanism thereof in the housing. The movable portion of the operating mechanism, such as a piston, as in the device shown in FIGURE 1, or a diaphragm, as in the device shown in FIGURE 4, is moved away from its normal or non-operating position by the fluid that is forced thereagainst.

As the fluid displaces the piston, or the diaphragm, the space created by the movement thereof is filled with the fluid. When a predetermined volume of fluid flows into the device, thus displacing the piston of the diaphragm a predetermined distance, actuation occurs. The operation of these devices is explained more particularly in U.S. Patent No. 2,942,572.

Since the response of a pressure-sensitive switch or indicator results when a predetermined volume of fluid flows into the device, the rate at which fluid enters the chamber enclosing the piston or the diaphragm to move it away from its non-operating position determines the rate at which the indicator signals or the switch actuates. If, in accordance with this invention, the rate of flow into this space is controlled, then the rate of actuation of the device is also so controlled. Normally, flow surges in a system are of relatively short duration. Thus, if a flow surge occurs, but the rate of flow of fluid to the operating mechanism of the indicator or switch is limited, the surge will end before enough fluid has been forced into the device to cause actuation thereof and actuation will not occur.

Moreover, in accordance with this invention, it is possible to maintain the rate of flow to the operating mechanism substantially constant, regardless of the magnitude of the flow surge, and thus maintain the rate of actuation of the indicator or switch constant, as well as eliminate unwanted response to flow surges.

The flow-restricting device of this invention limits flow to the operating mechanism of the indicator or switch by obstructing or constricting a passage leading to this mechanism. When a flow surge occurs, in the first fluid line, a relatively high fluid differential pressure is created in the line by the flow control passage. This high differential pressure creates force on the flow restrictor which moves it into position to restrict flow to the operating mechanism of the indicator switch. The force acting on the flow restrictor and the extent of the movement caused thereby are proportional to the magnitude of the flow surge. Thus, the amount of restriction or obstruction is proportional to the magnitude of the flow surge. Therefore, for high flow surges, the line will be constricted to a greater degree than for low flow surges and thus the rate of flow to the indicating mechanism can be made relatively constant. Thus a sufficient delay can be provided such that the flow surge ends before sufficient fluid passes to the operating mechanism to permit actuation thereof, and unwanted response to a flow surge is eliminated.

The operation and structure of preferred embodiments of this invention will be more particularly described below.

The pressure-responsive device shown in FIGURE 1 is a pressure indicator that is adapted to signal when the pressure drop across filter 17 exceeds a predetermined amount. When the fluid under the pressure of the system is passed through the filter 17 from the inlet line 18 to the outlet line 19, a pressure differential due to the resistance of flow passing through the filter is created. When the pressure differential due to the buildup of contaminants on and in the filter exceeds a predetermined amount, the indicator signals that the filter is clogged.

The pressure-responsive device shown in FIGURE 1 comprises a housing 13, formed in two portions 23 and 24. The outer portion 23 is formed with first and second lines 20 and 22, and is shaped to receive the inner portion 24 and is joined thereto by screw threads 25. The inner portion 24 houses the indicating mechanism. A gasket 50 is disposed between the two portions 23 and 24 and prevents leakage therebetween. Two magnetic elements 10 and 11 are coaxially mounted on opposite sides of a separating wall 12 within a housing 13. Preferably, both of the elements 10 and 11 are composed of permanently magnetized Alnico V magnets, or the like and are positioned with opposite magnetic poles adjacent to the wall 12, so that each is drawn toward the wall by the force of attraction between the magnetic poles.

The magnet 10 is mounted in a tubular piston 14 that is slidably supported in a cylindrical bore 15 in the housing 13. A coil spring 16 bears against a flange on the piston 14 and against a portion of the housing 13, thus urging the piston 14 toward the wall 12. A ring 16a of Teflon or other suitable material is disposed between the bore and the piston 14 to prevent fluid from passing from one end of the bore to the other.

On the other side of the wall 12, the other magnetic element 11 is slidably received in one end of a bore 27. This bore 27 is coaxial with the bore 15. A cap 28 is secured to the opposite end of the magnet 11 by a press-fit. This cap is generally tubular in shape and has an inner wall 29 that is spaced from the magnet. This forms a recess 30 between the magnet and the wall 29. A spring 31 extends from the cap 28 to the housing 13 and is disposed within this recess. The magnets 10 and 11 are disposed with the opposite poles facing each other, and the thickness of the wall 12 is selected such that the magnets 11 and 10 are separated only by a small distance e.g., $\frac{1}{16}$ inch. The spring 31 is selected such that the force it exerts is less than the magnetic attraction between the magnets 10 and 11, and thus when the magnets 10 and 11 are against opposite sides of the wall 12, the force of the spring 31 is overcome and the cap 28 is maintained in a lowered or depressed position. However, if the magnets are forced away from each other, the magnetic attraction therebetween will decrease and the force of the spring 31 will force the cap 28 upwardly.

To prevent the magnet 11 from being driven completely out of the bore 27, the tubular wall 29 is provided with a radial flange 32. The drum 33 has a central aperture 34 slightly smaller than the flange 32, but large enough to permit the cap 28 to pass through it. Also, a bimetallic element 35 is mounted at one end on the inside surface of the drum 33 to prevent actuation of the indicator when the viscosity of the fluid is above an amount due to low temperature. This bimetallic strip is more particularly described in U.S. Patent No. 2,942,572.

Figure 2:
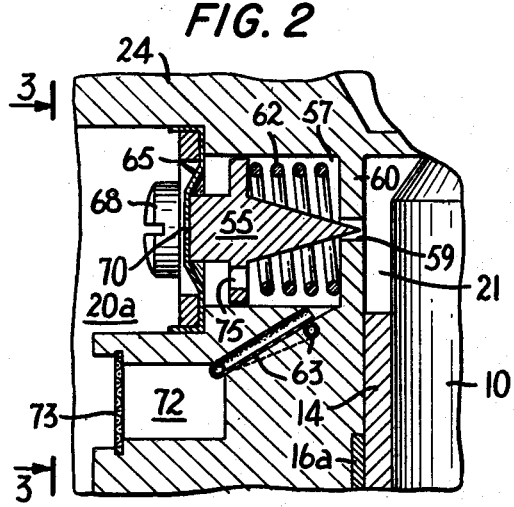
FIGURE 2 is an enlarged view in section and in greater detail of the flow restricting device shown in FIGURE 1 for controlling response of the indicator to flow surges.

The first fluid line 20 leads from the inlet line 18 to a chamber 21, that is defined by the upper end of the cylindrical bore 15 and the portion of the magnet 10 that extends above the piston 14. The second fluid line comprises a bore 22 that communicates with the outlet line 19, and thus exposes one side of the piston 14 to the outlet pressure. The line 20 leads from the inlet line 18 and has an enlarged portion 20a, in which the flow-restricting device 61 for controlling response of the indicator to flow surges is located. The flow-restricting device is best seen in FIGURE 2. The flow restrictor comprises a tapered flow-restricting poppet needle valve 55, that is located in a lateral bore 57 in the central portion of the housing 24. The bore 57 terminates short of the chamber 21 in an end portion 60. This end 60 has an orifice 59 therethrough that permits fluid communication between the bore 57 and the chamber 21. The point of the poppet needle valve is positioned for movement toward and away from the orifice to partially obstruct and so restrict flow therethrough. If desired, the end of the needle can normally extend into the orifice 59, but need not, as long as it restricts flow through the orifice when a flow surge occurs. The poppet valve 55 is forced by a spring 62 away from the orifice.

Figure 3:
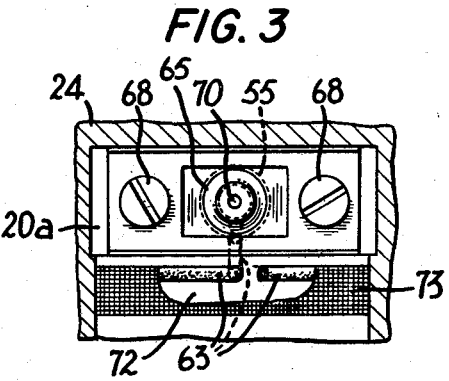
FIGURE 3 is an end view looking in the direction of the arrows in FIGURE 2, of the flow restricting device for controlling response of the indicator to flow surges.

A rectangular diaphragm 65 in the form of a steel strip is placed across the bore 57 and prevents the poppet from being forced from the bore. This diaphragm is held at its ends in position by screws 68 which hold the ends of the diaphragm against the housing, as best seen by reference to FIGURE 3. As indicated above, the diaphragm increases the sensitivity of the poppet to flow surges by increasing the area on which the flow surge acts thus providing more force acting on the poppet at a given pressure differential. It is therefore preferred. However, the diaphragm need not be used. In such a case, the poppet could be retained in the bore by a flange or the like. The diaphragm is provided with a centrally located aperture 70, that is disposed to abut the flat end of the poppet 55, thereby normally preventing fluid from passing through the aperture 70. The function of this aperture will be described below.

The bore 57 communicates with the line 20, and the space 20a, through a flow control passage 63 of relatively small dimensions, of the order of 0.006 inch in diameter. However, the size of this passage can vary somewhat, and is determined by reference to the particular fluid and the pressure conditions in connection with which this device is to be used. This passage can be formed by inserting a capillary tube of about 1.75 inches in length into a bore provided for it in the housing. The flow control passage 63 communicates with the chamber 72, which is separated from the enlarged portion 20a of the line 20 by a wire mesh screen 73. This screen removes contaminants from the fluid passing into the chamber 72 and to the flow-restricting device, and thus prevents clogging of the passage 63, or the orifice 59.

It can be seen in FIGURE 1 that the flow control passage 63 conducts fluid from the chamber 20a into the bore 57 upstream of the orifice. Since this passage is of small size and restricts flow therethrough, when a flow surge occurs, a pressure differential across the flow control passage is created. The diaphragm 55 is exposed to this pressure differential since it is exposed to fluid pressure both upstream and downstream of the passage. This pressure differential is proportional to the magnitude of the flow surge. The diaphragm moves the poppet valve 55 into the orifice 59 to restrict flow therethrough in an amount proportional to the flow surge.

Under normal conditions, operation of the indicator is as follows. Fluid is passed from the inlet line 18 through the filter 17 and to the outlet line 19. The tension of the spring 16 is selected such that under normal conditions the pressure drop across the filter does not produce a force that is sufficient to displace the magnetic element 10 from its position. When the filter becomes clogged, however, the pressure drop thereacross increases, and thus the pressure differential between the chamber 21 and the line 22 also becomes increased.

When the pressure differential from the chamber 21 to the line 22 produces a force sufficient to overcome the resistance of the spring 16, and the magnetic attraction between the magnets 10 and 11, the magnetic element 10 moves downwardly and permits more fluid to enter the chamber 21. As the magnet 10 is moved progressively further away from the magnet 11, the magnetic attraction therebetween rapidly decreases. When the magnetic attraction is less than the force of the spring 31, the cap 28 is forced upwardly, thus indicating that the filter has become clogged.

When the clogged filter is replaced, since there is no longer a high fluid pressure differential in the system due to a clogged filter, the fluid in the chamber 21 is forced from the chamber by the upward movement of the magnet 10 under the force of the spring 16. This excess fluid enters the first fluid line and is passed back into the system. The cap 28 can then be manually forced downwardly and the attraction of the magnetic element 10 will hold the magnet element 11 in its normal position against the wall 12.

It is to be noted that the flow-restricting device of the invention does not under normal conditions affect the operation of the indicating mechanism shown in FIGURE 1. Under normal conditions, the filter element becomes clogged gradually. Thus, the pressure differential thereacross is also gradually increased and the rate of flow of fluid into the chamber 21 is low. Thus, the flow control passage 63 does not cause an increase in pressure differential across the diaphragm 65. Therefore, the force of the spring 62 is not overcome by the force on the diaphragm and no movement of the poppet valve 55 results. Thus, the orifice 59 is not restricted under normal conditions, and response of the indicator is not affected.

If prior to clogging of the filter element a flow surge should occur in the line 18, if the pressure-responsive device is not provided with means to control response to flow surges, the device could falsely signal that the filter is clogged. This is due to the fact that the fluid would be driven by the force of the surge through the passage 20 into the chamber 21, thus displacing the magnet, and causing actuation of the indicator. However, flow surges are normally of relatively short duration. Therefore, if the rate of flow into the chamber 21 is deliberately restricted to a maximum rate that is maintained relatively constant under all conditions, and this maximum rate is slow enough, so that the time elapsed for the flow to reach the indicator is less than the time span of the surge, a surge of flow will not cause actuation of the gauge, since the surge of flow will cease before enough fluid has passed into the chamber 21 to move the magnetic element 10 a sufficient distance from the magnetic element 11 to permit signaling of the indicator. The fluid that passed into the chamber 21 during the surge then passes back into the system.

The flow-restricting device of the instance invention limits the rate of flow to the chamber 21 to thereby control response of the indicator to flow surges. When a surge of flow occurs in the line 18 and thus in the 20, and in the enlarged portion 20a of the line, flow is forced at a rapid rate into the chamber 72 and into the small flow control passage 63. However, since the flow control passage provides resistance to high flow rates therethrough due to its small diameter and relatively long length, a high pressure differential is immediately established across the passage and across the diaphragm. This produces a force on the diaphragm that overcomes the resistance of the spring 62 and moves the poppet needle into the orifice to restrict flow therethrough.

Thus, before the high flow can reach the chamber 21, it is restricted by the poppet 55 and orifice 69.

This rate of flow can be made relatively constant regardless of the magnitude of the flow surge.

The force created on the poppet to move toward the orifice is proportional to the pressure differential across the flow control passage, and the distance the poppet moves toward the orifice is proportional to the force thereagainst. Thus, since the pressure differential across the flow control passage is proportional to the magnitude of the flow surge, for high flow surges, the poppet will be moved further into the orifice than for lower flow surges. Thus, the amount of restriction of the orifice is proportional to the magnitude of the flow surge, and the rate of flow through the orifice can be maintained relatively constant for any flow surge.

This rate is selected such that the amount of flow forced into the chamber 21 during the time span of a surge is insufficient to cause actuation of the gauge, and thus actuation of the indicator does not result.

After the surge of flow ceases, and the resulting pressure differential caused thereby diminishes, the fluid forced into the chamber 21 will be forced therefrom by action of the spring 16. The flow control passage however will limit this backflow and in order to facilitate the rapid passage of this fluid from the chamber, the diaphragm is provided with a hole 70 that acts as a check valve. When the flow surge ceases, the pressure differential between the enlarged portion 20a and the line 22 will rapidly drop. The flow control passage, however, since it limits high flow in either direction, will maintain a relatively high pressure differential between chamber 21 and enlarged portion 20a. This pressure differential causes the diaphragm to bulge outwardly away from the poppet, thus exposing the hole 70 in the diaphragm and permitting fluid to rapidly pass from the chamber 21 through the aperture 59 through an aperture 75 in the poppet, and through the central apertures 70 in the diaphragm.

Another embodiment of this invention is shown in FIGURE 4. This pressure-responsive device is an electrically-operated fluid pressure-responsive switch. The pressure-responsive switch of FIGURE 4 comprises a housing formed in upper and lower portions 111, and 112, respectively, held together by a Z-band clamp 113. The upper and lower portions of the housing define a chamber 114 therebetween. The lower wall 115 of the chamber is provided with a matching plate 116. A flexible rubber diaphragm 119 is supported on the plate 116, and between the plate and an enlarged head 117 of a rod 118. The assembly of the plate 116, the rod 118 and the diaphragm 119 together constitute a diaphragm assembly. Movement of this assembly away from the lower wall 115 of the chamber 114 causes actuation of the switch 130.

The periphery of the diaphragm 119 is held between the upper and lower portions of the housing 111 and 112 and communication of fluid therebetween is prevented by the diaphragm. A pair of cup-shaped washers 121 and 120 locate a pair of coil springs 122 and 123. The spring 122 urges the diaphragm assembly toward the wall 15 and under normal conditions retains the diaphragm against this wall. Spring 123 assists upward movement of the diaphragm assembly for actuation of the switch when a predetermined pressure differential is reached.

A screw 124 is provided to adjust the tension of the spring 123 to any desired amount. Fluid pressures are communicated to the diaphragm by a first fluid line 127 on one side of the diaphragm and a duct 128 that communicates therewith, a duct 126 and a second fluid line 125 exposes the diaphragm to fluid differential pressure on the opposite side thereof. The ducts 126 and 128 can be connected to any fluid system to cause actuation of the switch 130 when the pressure drop across the ports exceeds a predetermined amount.

The switch 130 is mounted in a chamber 131 in the upper portion 111 of the housing. A lever 132 is located within the chamber 131 and is pivotally supported in the housing to actuate a switch button 134. A set screw 133 is located in proximity to the end of this lever arm 132 and engages the end of the rod 118. When the rod 118 rises it contacts the set screw 133. It can then move the arm 132 a sufficient distance to force the switch button 134 inwardly, to actuate the switch 130.

Figure 5:
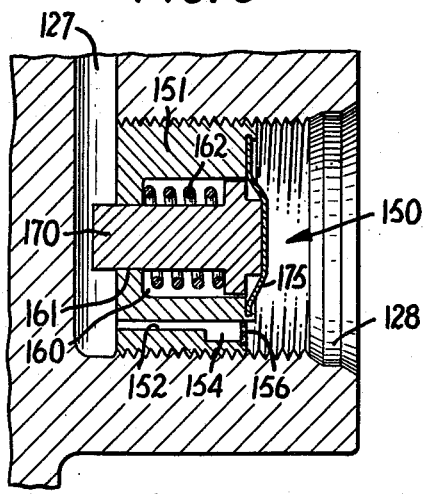
FIGURE 5 is an enlarged view in cross-section in greater detail of the flow restricting device for controlling response of the switch to flow surges shown in FIGURE 4.

The flow restricting device 150 for controlling response of this indicator to flow surges is best seen by reference to FIGURE 5. It is located at the intersection of the duct 128 and the first fluid line 127. This flow-restricting device 61 is housed in a housing 151 in the form of a threaded plug. This threaded plug housing 151 is adapted to engage threads in the duct 128 and thus can be readily inserted in existing fluid pressure-responsive devices of this type.

The housing is formed with a capillary size flow control passage 152 of 0.004 inch in diameter and one inch in length. The flow control passage 152 opens at one end into the first fluid line 127, and at the other end, into a chamber 154 having a filter screen 156 thereacross. This filter screen prevents the passage of contaminants into the pressure-responsive switch mechanism. The passage 152 and the chamber 154 are disposed to permit comminication of fluid from the duct 128 through the chamber 154 and through the passage 152 into the first fluid line 127.

The housing 151 is also formed with a bore 160 having a central aperture 161 at the end thereof. A flow-restricting piston 170 is located within the bore 160 and extends through the central aperture 161 into the passage 127. A helical spring 162 is positioned about the flow-restricting piston and tends to force the piston out of the line 127. A diaphragm 175 is disposed across the end of the bore 160 and prevents the piston from being driven from the bore by the spring. Since the diaphragm provides increased surface area for fluid pressure to act against, it increases sensitivity of the device to flow surges.

Operation of this device is as follows: Under normal conditions, when the pressure differential between the lines 127 and 125 exceeds a predetermined minimum, the diaphragm assembly moves away from the wall 115 due to the pressure of the fluid in the line 127, acting thereon, thus moving the rod 118 upwardly. The rate of movement of this arm 118 is controlled by the rate of flow of fluid from the passage 127 into the space beneath the diaphragm 119, as it is moved. As the rod moves upwardly, the lever 132 is pivoted causing actuation of the switch 130.

During normal operation of the switch, the flow-restricting device does not affect the movement of the diaphragm. This is due to the fact that the flow control passage 152 is dimensioned such that flow caused by the normal operating conditions of the system is not restricted by the passage 152. Thus, no pressure differential of substantial magnitude is developed across the passage, and therefore, no substantial force acts upon the diaphragm to move the piston into a flow-obstructing or restricting position.

When a flow surge occurs, in the duct 128, the flow control passage 152 restricts the flow therethrough and creates a relatively high fluid pressure differential thereacross. This fluid pressure differential forces the diaphragm and the piston with it inwardly, causing the piston to restrict flow in line 127. Thus, this embodiment prevents actuation of the switch to flow surges in the same manner as the embodiment described above in connection with FIGURES 1-3.

The instant invention provides a mechanism for maintaining the rate of flow into a pressure-responsive device constant and thus provides a constant actuation time for the device. The instant invention also provides a relatively simple device that can be made quite small and one that eliminates response of a pressure-responsive device to flow surges.

Having regard to the foregoing disclosure, the following is claimed as the inventive and patentable features thereof:

1. A fluid differential pressure-responsive device having a controlled response to flow surges, comprising, in combination, a housing defining therewithin the walls of a chamber, the housing further defining therewithin a first fluid passage extending from a first source of fluid pressure through a wall of the chamber into the interior thereof and connecting the chamber with said first source of fluid pressure, and a second fluid passage extending from a second source of fluid pressure through a wall of the chamber into the interior thereof and connecting the chamber with said second source of fluid pressure; differential pressure-responisve means movably mounted in the chamber, so positioned between the two fluid passages as to be exposed to pressure in both fluid passages, and arranged to move between first and second positions in the chamber, in response to a predetermined pressure differential between the passages; and a flow-restricting mechanism for controlling response of the device to surges in flow in the first fluid passage, said flow restricting mechanism being positioned in a portion of the first fluid passage of sufficient size to accommodate it, and between the interior of the chamber and the first source of pressure, said flow-restricting mechanism comprising flow control means in the first fluid passage in the line of fluid flow in said first passage to and from said chamber such that flow to and from the chamber via the first passage passes through said flow control means, a flow restrictor movably mounted in said portion of the first fluid passage adjacent said flow control means for movement toward and away from said flow control means and disposed for cooperation with the flow control means such that movement toward said flow control means constricts flow therethrough and thus restricts flow to the chamber; bias means urging said flow restrictor away from said flow control means, to normally permit flow through the flow control means, said flow restrictor having a pressure surface exposed to fluid pressure in the first fluid passage, and responsive to a predetermined flow surge in the first fluid passage, to move towards said flow control means to restrict flow therethrough, and thereby control flow to the pressure-responsive means.

2. A fluid differential pressure-responsive device in accordance with claim 1, in which the flow-restricting mechanism controls flow through the first fluid passage proportionally to the magnitude of a flow surge to maintain the rate of flow therethrough relatively constant.

3. A fluid differential pressure-responsive device in accordance with claim 1, in which the flow control means defines an orifice in the first passage; a flow control portion in the first passage leading to the orifice and dimensioned to create a pressure differential across the flow control portion in response to a flow surge; said flow restrictor comprising a poppet mounted in the housing for movement toward and away from the orifice to restrict flow therethrough; and a diaphragm mounted in the housing to abut the upstream side of the poppet such that the diaphragm is exposed to the pressure differential across the flow control portion caused by a flow surge to the flow control portion in the first passage, and is adapted to bear against the poppet to move said poppet toward the orifice in response to the fluid pressure differential across the flow control portion.

4. A fluid differential pressure-responsive device in accordance with claim 1, in which the flow-restrictor is a piston.

5. A fluid differential pressure-responsive device in accordance with claim 1 including a flow control passage in the housing dimensioned to restrict flow therethrough thereby creating a pressure differential thereacross when a flow surge occurs; said passage being located in the housing in a position to expose the movable flow restrictor to the pressure differential across the passage occurring as a result of a flow surge, and move the flow restrictor to restrict flow to the chamber when a flow surge occurs.

6. A fluid differential pressure-responsive device in accordance with claim 5, in which the housing defines an enlarged portion in the first fluid passage and the flow control passage receives flow from the enlarged portion, and in which the pressure surface of the flow restrictor is exposed to fluid pressure in the enlarged portion.

7. A fluid differential pressure indicator having a controlled response to flow surges comprising, in combination, a housing having therewith a partition dividing the housing into two noncommunicating portions, said housing defining, in one of said portions, the walls of the chamber one end of which is closed off by said partition, the housing further defining therewithin a first fluid passage extending from a first source of fluid pressure through a wall of the chamber into the interior thereof and connecting the chamber with said first source of fluid pressure, and a second fluid passage extending from a second source of fluid pressure through a wall of the chamber into the interior thereof and connecting the chamber with said second source of fluid pressure; magnetic differential pressure-responsive means movably mounted in the chamber and so positioned between the two fluid passages as to be exposed to pressure in both fluid passages and arranged to move between first and second positions in the chamber in response to a predetermined pressure differential between the passages; indicating means in the housing on the opposite side of the partition from the chamber, said indicating means being responsive to the movement of the magnetic differential pressure responsive means on the opposite side of the partition so as to indicate the existence of a predetermined fluid pressure differential between the first and second passages; and a flow restricting mechanism for inhibiting response of the device to surges and flow in the first fluid passage, said flow restricting mechanism being located in a portion of the first fluid passage of sufficient size to accommodate the flow restricting mechanism between the interior of the chamber and the first source of pressure, said flow restricting mechanism comprising means defining an orifice in the first fluid passage in the line of flow in said first passage to and from the chamber such that flow to and from the chamber via the first passage passes through the orifice; a poppet movably mounted in the first fluid passage adjacent to the orifice for movement toward and away from the orifice to restrict flow through the orifice, said flow restrictor having a pressure surface exposed to fluid pressure in the first fluid passage; bias means normally urging said flow restrictor away from the orifice to normally permit flow to pass through the orifice; and a flow control passage in the housing dimensioned to restrict flow therethrough and thereby create an increased pressure differential thereacross when a flow surge to said flow control passage occurs, said flow control passage being positioned so as to expose the pressure surface of the flow restrictor to the increase in pressure differential caused by a surge of flow to the flow control passage, and move the poppet toward the orifice to restrict flow therethrough in response to a flow surge to inhibit response of the indicator to a flow surge.

8. A fluid differential pressure indicator in accordance with claim 7 including a diaphragm mounted in the first fluid passage in a position to abut the poppet and move the poppet toward the orifice in response to a flow surge to restrict flow through the orifice in an amount dependent upon the magnitude of the flow surge, said poppet being mounted in an enlarged portion of the first fluid passage defined by the housing.

9. A fluid differential pressure indicator in accordance with claim 8, in which the diaphragm has an aperture therethrough, comprising, in combination with the poppet, a check valve.

10. A fluid differential pressure device having a controlled response to flow surges comprising, in combination, a housing defining therewithin the walls of the chamber, said housing further defining a first fluid passage extending from a first source of fluid pressure through a wall of the chamber into the interior thereof and connecting the chamber with the first source of pressure, and a second fluid passage extending from a second source of fluid pressure through a wall of the chamber into the interior of the chamber and connecting the chamber with the second source of fluid pressure; a diaphragm assembly movably mounted and so positioned between the two fluid passages as to be exposed to pressure in both and arranged to move in response to a predetermined fluid pressure differential between the first and second passages; switch means associated with the housing and responsive to movement of the diaphragm to signal whenever the predetermined fluid pressure differential between the first and second passages exists; a piston mounted in the first fluid passage for movement toward and away from a wall of the passage to constrict said passage and restrict flow therethrough to or from the chamber, bias means normally urging the piston away from a flow restricting position; means in the first passage defining a flow control passage dimensioned to restrict flow therethrough and create a pressure differential across the passage whenever a flow surge occurs, said flow control passage being positioned such that the piston is exposed to the pressure differential caused by a flow surge to the flow control passage so as to thereby move the piston toward the wall of the first fluid passage in response to a flow surge to restrict flow through the passage in an amount dependent upon the magnitude of the flow surge so as to thereby inhibit response of the switch to the flow surge.

(References on following page)

References Cited

UNITED STATES PATENTS

| | | | |
|---|---|---|---|
| 2,942,572 | 6/1960 | Pall | 116—117 |
| 2,948,151 | 8/1960 | Astl | 73—406 |
| 3,011,470 | 12/1961 | Stoermer | 116—117 |
| 3,077,176 | 2/1963 | Pall et al. | 116—70 |
| 3,077,854 | 2/1963 | Pall | 116—70 |
| 3,140,690 | 7/1964 | Siebel | 116—70 |
| 3,187,711 | 6/1965 | Campolong | 116—70 |
| 3,209,721 | 10/1965 | Pall et al. | 116—70 |
| 3,212,471 | 10/1965 | Willis | 116—70 |
| 3,270,884 | 9/1966 | Bremer | 210—90 |
| 3,335,863 | 8/1967 | Silverwater | 210—90 |
| 337,236 | 3/1886 | Briscoe | 137—517 |
| 1,087,883 | 2/1914 | Loomis | 73—392 |
| 1,096,431 | 5/1914 | Kepple | 137—517 |
| 1,569,830 | 1/1926 | Watters | 137—517 |
| 2,041,198 | 5/1936 | McLean | 137—517 |
| 2,179,144 | 11/1939 | Buttner | 137—517 |
| 2,354,362 | 7/1944 | Burns | 137—517 |
| 2,803,718 | 8/1957 | Bloom et al. | 200—82 |
| 2,824,186 | 2/1958 | Binford | 200—83 |
| 2,843,077 | 7/1958 | Leefer | 116—70 |
| 2,897,675 | 8/1959 | Kocher et al. | 73—420 |

LOUIS J. CAPOZI, Primary Examiner

U.S. Cl. X.R.

210—90